May 26, 1959 J. O. ARMSTRONG 2,887,760
CUTTING TOOL
Filed May 28, 1956
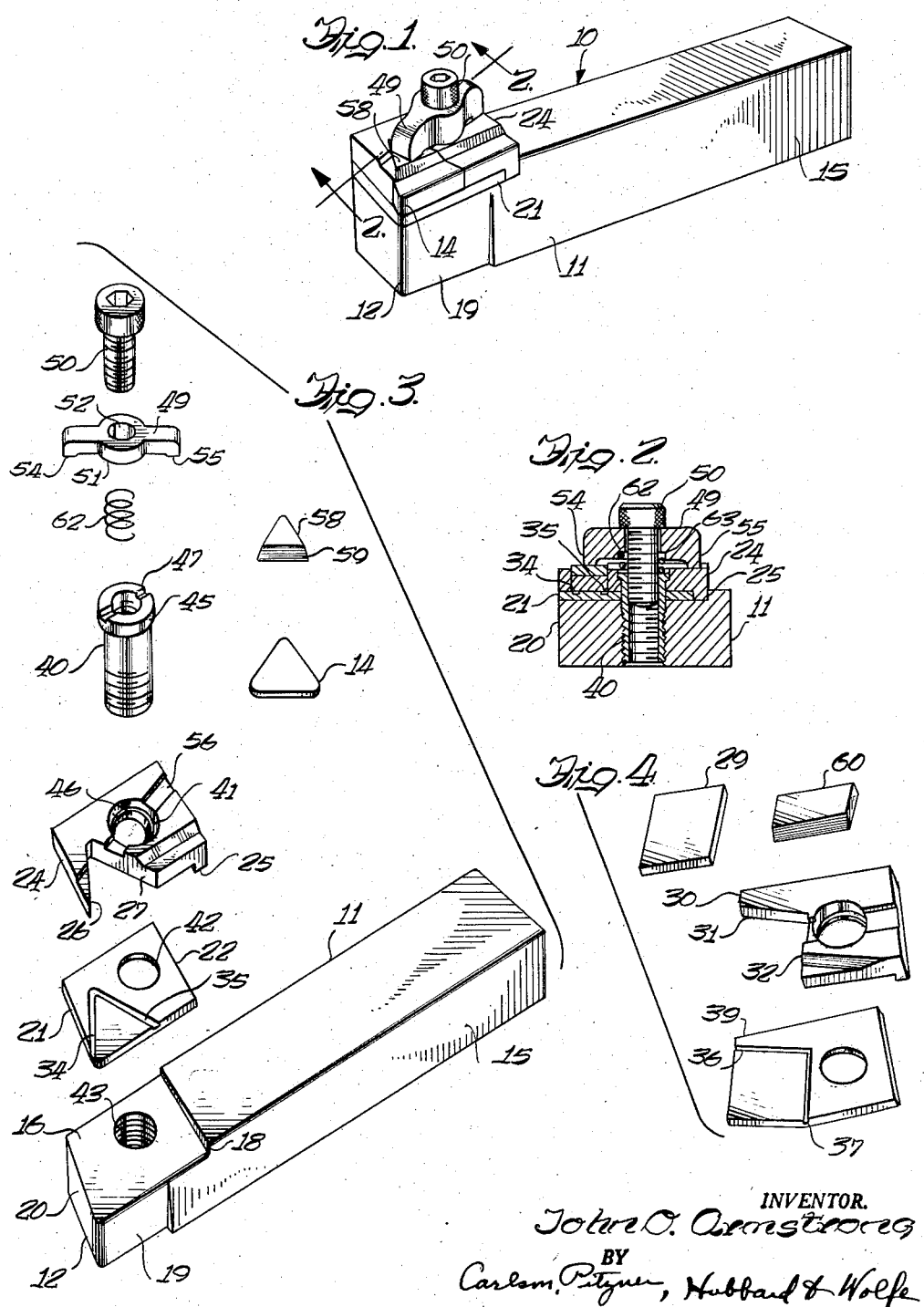
INVENTOR.
John O. Armstrong
BY
Carlson, Pitzner, Hubbard & Wolfe
Attorneys

United States Patent Office 2,887,760
Patented May 26, 1959

2,887,760

CUTTING TOOL

John O. Armstrong, Palatine, Ill., assignor to Armstrong Bros. Tool Co., Chicago, Ill., a corporation of Illinois Application May 28, 1956, Serial No. 587,776

2 Claims. (Cl. 29—96)

The present invention relates to a Cutting Tool and more particularly to a Carbide Insert Cutting Tool.

It is an object of the present invention to provide a cutting tool having a replaceable cutting tip or bit which permits rapid removal of the cutting tool edge as well as replacement of the entire tip or bit. It is a related object to provide a tool of the foregoing type particularly adapted for use with replaceable tips or bits of carbide materials.

Another object of the present invention is to provide a cutting tool in which the cutting tip is held firmly and positively in a manner to minimize chatter or vibration of the tip. It is also an object of the present invention to provide a cutting tool which supports the tip against breakage. The latter is especially important when tips are of brittle material, such as tungsten carbide, are used.

A further object of the present invention is to provide a cutting tool with a replaceable cutting tip which may be repeatedly assembled with accurately positioned relation of its parts and is versatile in permitting adaption to different cutting conditions and cutting tips.

Still another object is to provide a cutting tool in which parts subject to wear may be renewed without discarding the entire tool.

Further objects and advantages of the present invention, as the following written description proceeds, are taken in connection with the accompanying drawing in which:

Fig. 1 is a perspective of a cutting tool embodying the present invention.

Fig. 2 is a partial section of the tool of Fig. 1 taken along the line 2—2.

Fig. 3 is an exploded perspective of the various components of Fig. 1.

Fig. 4 is a perspective of the components used with a square insert of cutting material.

While the invention is susceptible of various modifications, alternatives and variations, there is described herein, in some detail, the preferred embodiment of the invention but it is to be understood that the intent is not to limit the invention to the specific forms disclosed. On the contrary, the aim is to cover all modifications, alternatives and variations falling within the scope and spirit of the invention as expressed in the appended claims.

Referring now to the drawing, the invention is shown embodied in an illustrative tool holder 10 of the type described generally as a single point tool which, in the present instance, is a single pointed lathe tool. The body portion or supporting portion of the tool is formed by a shank 11 having a substantially rectangular cross section with means at one end 12, called the cutting end for convenience, for mounting a cutting tip or bit 14. The second end portion 15 which comprises the larger portion of the shank has substantially plane surfaces and is adapted to be received in the mounting clamp or tool post of the machine with which the tool is to be used. The clamping end portion 15 of the shank 11 may be of any desired configuration to suit the mounting means of the machine tool.

It will be understood by those skilled in the art that many cutting methods and procedures involve the use of a cutting material with cutting characteristics superior to those of steel and that carbide materials, such as sintered tungsten carbide, have been used for this purpose. Carbide cutting materials are, however, expensive, difficult to shape and sharpen, and are relatively brittle. The present invention is concerned with a tool having a cutting end portion adapted to use such carbide cutting materials and which takes into account the characteristics of that type of material.

To minimize the amount of cutting material required and eliminate the need for resharpening the cutting edges, means are provided for replaceably mounting a disposable insert 14 of cutting material on the tool. For this purpose the shank 11 of the tool is provided with a tip or insert supporting surface 16 on its cutting end portion. With reference to the shank illustrated in Figs. 1 and 3 of the drawing, the shank 11 is there shown having a downwardly offset planar mounting surface extending from its cutting end rearwardly along the upper face of the shank to an upstanding shoulder or abutment 18. The shoulder or abutment 18 extends crosswise of the shank substantially perpendicular to the longitudinal axis of the shank, and in the present embodiment of the invention, comprises means for locating and positioning the cutting tip 14 and its mounting means relative to the shank.

In accordance with the principles of cutting tools, the side and end faces 19, 20 of the cutting end portion 12 of the shank may be inclined to provide the desired side and end relief. In addition, the tip supporting surface 16 may be angled with respect to the axes of the shank to provide the desired cutting angles. By way of illustration the supporting surface 16 may be inclined downwardly toward the cutting end of the shank to provide a negative rake angle such as is commonly used with carbide cutting material.

In carrying out the present invention means are provided for protecting the tip supporting surface of the shank from wear and maintaining its original shape and surface condition. In the instant tool such means is formed by a replaceable seat 21 which comprises a plate of hard steel, such as high carbon or high speed steel, and is shaped to conform to the outline of the end portion of the supporting surface 16. The upper and lower surfaces of the seat 21 are preferably parallel to each other and the rear edge 22 of the seat is parallel to, but spaced from, the locating shoulder 18 on the shank. The reason for the latter will be explained presently. When positioned on the shank, the lower surface of the replaceable seat 21 rests on and covers substantially the entire supporting surface 16 of the shank, and carries on its upper surface the cutting tip or insert 14.

Means are also provided for accurately and positively positioning both the replaceable seat 21 and the cutting tip 14 relative to the shank. In the illustrative tool this means is in the form of a locator plate 24 which has a depending locator or spacing lug 25 at its rear end, and has vertical shoulders or walls 26, 27 adjacent its forward end for positioning the cutting tip. The depending lug 25 in the illustrative tool forms a spacing shoulder extending crosswise of the locator plate 24 and has a height substantially equal to, or slightly less, than the thickness of the replaceable seat 21. The width of the shoulder on the locator plate 24 is equal to the spacing between the rear edge of the replaceable seat 21 and the positioning shoulder 18 of the shank. Thus as best shown in Figs. 1 and 2, the rear edge of the spacing lug or shoulder abuts against the positioning shoulder of the shank and accurately locates the replaceable seat on the shank when assembling the tool.

To position the cutting tip 14 on the shank, the vertical edge faces 26, 27 on the outer end portion of the locator plate 24 are shaped to engage two edges of the cutting tip 14. With reference to Figs. 1, 2 and 3, the tool is shown adapted for use with a cutting tip in the shape of a triangular insert having three substantially equal sides. To accommodate such an insert, the tip positioning faces of the locator plate 24 define an open V to engage the two trailing, or non-cutting, edges of the insert. More specifically, one of the tip positioning faces 26 extends diagonally from the forward leading corner of the shank 11 rearwardly towards the center of the tool. The second of the positioning faces 27 extends diagonally from the trailing end of the first face 26 to a point on the leading edge of the shank spaced inwardly from the forward leading corner of the shank. With this configuration, the triangular insert 14 is restrained from movement in all horizontal directions except forwardly toward the leading side face 19 of the tool. The cutting forces on the cutting tip or insert 14 act to oppose such forward movement of the tip and tend to urge it into the V-shaped recess formed by the positioning faces 26, 27 of the locator plate helping to insure positive location of the tip.

In Fig. 4 there is shown a cutting tip or insert 29 of square or rectangular shape having four substantially equal edges. For use with a tip of this shape a locator plate 30 is provided which has tip positioning faces 31, 32 which are at substantially right angles to each other. One face 31 extends rearwardly from the outer end of the shank and the other face 32 extends transversely from the rear end of the first face to the leading side edge of the shank. There is thus formed a square or rectangular recess with open sides at the end and leading edge of the shank. As with the triangular tip, the cutting forces acting on the square or rectangular tip 29 urge it into the recess since the cutting operation exerts both an end thrust and side thrust against the cutting tip.

To insure good contact and seating of the cutting tip 14, and the locator plate 24 on the tool, in this instance on the replaceable seat 21, the bearing surface on which the tip rests has relieved portions under the edges of the tip when the latter is in position on the tool. As shown in Fig. 3, the relieved portions comprise relatively shallow channels or grooves 34, 35 in the seat 21 arranged in a V formation and underlying the trailing edges of the tip 14. The grooves 34, 35 consequently lie immediately adjacent the positioning faces 26, 27 of the locator plate 24, and may, if desired, partially underlie the positioning faces. With reference to Fig. 4, the relieved portions are also channels or grooves 36, 37 formed in the seat 39, and correspond to the outline of the trailing edges of the tip 29 and juncture of the positioning faces 31, 32 on the locator plate 30.

In order to hold the various parts of the tool in place and to clamp the replaceable tip or insert 14, means are provided which, in the illustrated tool, comprise a novel screw means and clamping bar. The clamping means is arranged to permit interchange of cutting tips without disturbing the locator plate 24 and replaceable seat 21 and, if desired, to permit removal of the last two named components as well.

For this purpose a combination fastener in the form of a hollow screw 40 having both internal and external threads is provided. The screw 40 is received in alined apertures 41, 42, 43 in the locator plate 24, replaceable seat 21 and shank 11, respectively. Engaging the external threads on the screw are mating threads in the aperture or hole 43 through the shank. The upper end portion of the screw has an enlarged head 45 for bearing against the locator plate 24 with a resultant clamping of the locator plate and the underlying replaceable seat 21 to the shank. Preferably, the top of the screw is flush with the upper surface of the locator plate 24 and to accomplish this the screw has an enlarged cylindrical head and the aperture 41 in the locator plate is counterbored to receive the head 45 of the screw. An internal annular ring or shoulder 46 defining the lower end of the counterbore engages the bearing surface of the head 45. To permit tightening of the screw a diametrical kerf 47 is provided on the enlarged head.

After clamping the locator plate 24 and seat 21 to the shank, the cutting tip 14 is removably held on the seat, and in the pocket formed by the locator plate, by a clamp bar 49 and clamp bar screw 50 which engages the internal threads of the hollow locator screw 40. The clamp bar 49 comprises a short bar having a laterally enlarged central portion 51 with a vertical hole 52 for receiving the clamp bar screw 50. The ends of the clamp bar each have a depending projection or foot 54, 55 to bear respectively on the upper surface of the locator plate 24 and the cutting tip 14, so that tightening the clamp bar screw firmly holds the tip in place.

To correctly aline the clamp bar 49 and angularly position it with one depending foot over the cutting tip, the upper face of the locator plate 24 has means for guiding and holding the clamp bar. For this purpose the locator plate of the exemplary tool has a flat bottomed groove 56 in its upper surface to receive the second one of the depending feet of the clamp bar. The guide groove 56 extends radially from the locator screw aperture 41 in a generally rearward direction as shown in Fig. 3 of the drawing, and is wide enough to receive the foot of the clamp bar 49 between the upstanding side walls of the groove. Abutting interference between the clamp bar foot and the sides of the groove limits the lateral swing of the clamp bar and properly positions it. With this arrangement the clamp bar 49 is automatically alined with the cutting tip 14 and will not swing out of alinement when the clamp bar screw is being turned to press the bar into clamping engagement with the cutting tip.

Means are also provided to permit the use of a chip breaker if desired. As illustrated in the drawing, the chip breaker comprises a small piece 58 of hard, abrasion resistant material, preferably of the same sintered carbide material as the cutting tip. The chip breaker 58 is approximately half the size of the cutting tip 14, being located over the trailing half of the tip, and has an upwardly beveled leading edge 59 to impart a sharp upward bend in the metal chips which flow across the top of the tip during the cutting operation. For convenience the chip breaker may be of the same thickness as the tip or insert. For use with a triangular tip, the chip breaker also has a triangular shape. When a rectangular tip 29 is used a rectangular chip breaker 60 is provided.

To permit this tool be be used either with or without a chip breaker 58, 60, the locator groove 56 and the feet, or depending projections 54, 55 on the clamp bar are so arranged relative to each other to clamp either the tip alone, or the tip and chip breaker together merely by reversing the clamp bar end for end. To accomplish this the feet on the clamp bar differ in height by approximately half the thickness of the chip breaker 58, 60, and the bottom of the clamp bar locator groove 56 is vertically positioned to intersect the chip breaker approximately half way between its top and bottom surfaces. By placing the shorter one 54 of the feet in the locator groove 56, the second or longer foot 55 will bear against the top of the cutting insert. However, when it is desired to use a chip breaker, the clamp bar 49 is reversed with the longer foot 55 in the locator groove 56. The shorter foot 54 then terminates substantially level with the top of the chip breaker for clamping both chip breaker and cutting tip in place.

It has also been found that the replacement of the cutting tips and chip breakers is facilitated by placing the clamp bar 49 under a resilient upward tension to lift it from clamping position when the clamping screw 50 is released. For this purpose, a coil type compression spring 62 is placed around the clamp bar screw intermediate the clamp bar and the head of the hollow locator screw. To provide space for the spring 62, the underside of the clamp bar may be recessed or counterbored, as at 63. The spring 62 urges the clamp bar 49 away from the cutting tip 14 and holds it out of the way when it is desired to insert a new tip or chip breaker.

It is not necessary with the tool of the present invention to replace the cutting tip when the first edge becomes dull, but on the contrary, the tips may have each of their edges used for cutting. In the case of the triangular tip, six cutting edges are available, and with the square tip there are eight cutting edges. The tips are merely rotated or turned upside down to place any of the cutting edges in working position. It is to be understood, however, that the particular shape of the replaceable tip may be varied to suit the requirements of the user. It is necessary only that for each shape of cutting tip a locator plate and replaceable seat with correspondingly arranged positioning faces and relief grooves be provided.

I claim as my invention:

1. A cutting tool for use with a replaceable cutting tip and chip breaker, comprising in combination, a shank having a cutter supporting surface and an upstanding shoulder, a locating member overlying said supporting surface and having walls forming a pocket for receiving a cutting tip and a chip breaker superimposed thereon, a clamp bar having a pair of horizontally spaced downwardly offset clamping surfaces positioned to overlie said pocket and said locating member respectively, and a force applying connection between said clamp bar and said shank for exerting downward clamping pressure on said bar and for selectively reversing the positions of said clamping surfaces, said offset clamping surfaces being vertically displaced from each other by half the thickness of said replaceable chip breaker, said locating member having a bearing surface for alternate engagement by said clamping surfaces positioned vertically midway of the thickness of said replaceable chip breaker superimposed on said cutting tip for clamping said cutting tip and superimposed chip breaker in one position of said clamping surfaces and for clamping said tip alone in the reverse position.

2. A holder for use with replaceable inserts of cutting material and removable chip breakers, comprising in combination, a shank, a removable seat plate on said shank for supporting said replaceable inserts, an upstanding abutment on said shank adjacent the rear of said seat plate, a locating plate overlying said seat plate and having a depending shoulder between said seat plate and said abutment for relatively positioning said seat plate and said abutment, said locating plate having walls extending substantially perpendicularly upwardly from said seat and being located to form a receiving pocket for an insert of cutting material and a superposed chip breaker, said seat having a relief groove formed in its upper surface at the juncture of the latter and said pocket forming walls, a first removable fastener holding said seat and locating plates to said shank, a clamp bar having a pair of downwardly offset bearing areas positioned respectively to overlie said pocket and engage the upper surface of said locating plate, and a pivotal force applying connection between said clamp bar and said shank for exerting downward clamping pressure on said bar and for horizontal swing of said bar to selectively reverse the respective positions of said bearing areas, said bearing areas being vertically displaced from each other by a half of the thickness of said removable chip breaker, said locator plate having a groove in the upper surface thereof to receive a selected one of said bearing areas to hold clamp bar in said reverse positions, the bottom of said groove being vertically positioned above said insert of cutting material by half the thickness of said chip breaker to locate said clamp bar bearing areas vertically for clamping an insert alone and for clamping an insert and a superposed chip breaker upon reversal of said bearing areas.

References Cited in the file of this patent
UNITED STATES PATENTS

| | | |
|---|---|---|
| 1,376,077 | Cadwallader | Apr. 26, 1921 |
| 2,716,800 | Bader | Sept. 6, 1955 |
| 2,725,793 | Gamura | Dec. 6, 1955 |
| 2,734,256 | Forward | Feb. 14, 1956 |

FOREIGN PATENTS

| | | |
|---|---|---|
| 159,783 | Great Britain | Mar. 10, 1921 |

OTHER REFERENCES

Bulletin, Multicut Series for "Throw-away" Carbide Inserts Bulletin No. 552–M by Wesson Co., 1220 Woodward Hgts. Blvd., Ferndale 20, Mich. (4 pages).